(12) United States Patent
Motomura et al.

(10) Patent No.: US 11,433,748 B2
(45) Date of Patent: Sep. 6, 2022

(54) SUNROOF DEVICE AND METHOD FOR MANUFACTURING DRIVING SHOE OF SUNROOF DEVICE

(71) Applicant: AISIN CORPORATION, Kariya (JP)

(72) Inventors: Shota Motomura, Kariya (JP); Akinobu Muro, Kariya (JP); Katsutoshi Kato, Kariya (JP)

(73) Assignee: Aisin Corporation, Aichi (JP)

( * ) Notice: Subject to any disclaimer, the term of this patent is extended or adjusted under 35 U.S.C. 154(b) by 268 days.

(21) Appl. No.: 16/816,923

(22) Filed: Mar. 12, 2020

(65) Prior Publication Data
US 2021/0061075 A1    Mar. 4, 2021

(30) Foreign Application Priority Data
Aug. 26, 2019 (JP) .............................. JP2019-153657

(51) Int. Cl.
| | | |
|---|---|---|
| *B60J 7/043* | (2006.01) | |
| *B60J 7/053* | (2006.01) | |
| *B29C 45/14* | (2006.01) | |
| B29L 31/30 | (2006.01) | |
| B29K 705/00 | (2006.01) | |

(52) U.S. Cl.
CPC ......... *B60J 7/043* (2013.01); *B29C 45/14065* (2013.01); *B60J 7/0435* (2013.01); *B60J 7/053* (2013.01); B29K 2705/00 (2013.01); B29L 2031/30 (2013.01)

(58) Field of Classification Search
CPC ..... B60J 7/028; B60J 7/043; B60J 7/05; B60J 7/053; B60J 7/057; B60J 7/0573
USPC .................................................. 296/221–223
See application file for complete search history.

(56) References Cited

U.S. PATENT DOCUMENTS

| | | | | |
|---|---|---|---|---|
| 6,513,866 | B1* | 2/2003 | Manders ................ | B60J 7/0435 296/216.02 |
| 7,914,073 | B2* | 3/2011 | Hotta ....................... | B60J 7/024 296/223 |
| 9,592,723 | B2* | 3/2017 | Ohdoi ........................ | B60J 7/05 |
| 2011/0121616 | A1* | 5/2011 | Chlapecka ............... | B60J 7/043 296/221 |
| 2013/0020838 | A1* | 1/2013 | Nishiyama ............... | B60J 7/053 296/216.08 |

FOREIGN PATENT DOCUMENTS

| | | |
|---|---|---|
| JP | 2009-202627 | 9/2009 |
| JP | 2015-058838 | 3/2015 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

In a sunroof device, a driving shoe includes a first plate being made of metal and including a first engaging wall engaging with a first guide portion of a support member, a second plate being made of metal and including a second engaging wall engaging with a second guide portion of the support member, and a sliding portion sliding with a guide rail. The driving shoe, by moving along the guide rail with the first engaging wall and the second engaging wall engaging with the first guide portion and the second guide portion, respectively, causes a rear edge portion of a movable panel to ascend or descend via the support member. In the driving shoe, the first plate and the second plate are coupled to each other in a width direction by the sliding portion.

16 Claims, 8 Drawing Sheets

SUNROOF DEVICE AND METHOD FOR MANUFACTURING DRIVING SHOE OF SUNROOF DEVICE

CROSS REFERENCE TO RELATED APPLICATIONS

This application is based on and claims priority under 35 U.S.C. § 119 to Japanese Patent Application 2019-153657, filed on Aug. 26, 2019, the entire content of which is incorporated herein by reference.

TECHNICAL FIELD

This disclosure generally relates to a sunroof device and a method for manufacturing a driving shoe of the sunroof device.

BACKGROUND DISCUSSION

In JP2015-58838A (Reference 1), a sunroof device is described that includes a movable panel that opens and closes an opening portion formed in a roof of a vehicle, guide rails that extend in a vehicle front-rear direction at both edge portions in a vehicle width direction of the opening portion, support members that support the movable panel, and sliders (hereinafter, also referred to as "driving shoes") that move along the guide rails.

Each support member has a shoe that engages with one of the guide rails at a front edge portion, and, to the support member, a pair of cam grooves are formed on both sides in the vehicle width direction thereof. Each slider includes a sliding portion that engages with one of the guide rails and a pair of engaging portions that respectively engage with the pair of cam grooves of the support member.

When the sliders are moved to a vehicle front side while the movable panel is in a fully closed state, the engaging portions of the sliders slide with the cam grooves of the support members. Then, the engaging portions of the sliders push up rear edge portions of the support members via the cam grooves. As a result, the movable panel is brought to a tilted state in which a rear edge portion thereof ascends. On the other hand, when the sliders are moved to a vehicle rear side while the movable panel is in the tilted state, engaging shafts of the sliders slide with the cam grooves of the support members. Then, the engaging shafts of the sliders push down the rear edge portions of the support members via the cam grooves. As a result, the movable panel returns to the fully closed state.

In the sunroof device as described above, the pair of engaging portions of each slider are formed by performing bending processing on a sheet of metal plate. For this reason, when processing precision of a metal plate is low, there is a possibility that sliding resistance between the engaging portions of the slider and the cam grooves of the support member increases. Accordingly, in the sunroof device as described above, forming the pair of engaging portions of the slider with high precision is expected.

A need thus exists for a sunroof device and a method for manufacturing a driving shoe of the sunroof device which are not susceptible to the drawback mentioned above.

SUMMARY

A sunroof device that solves the above-described problem includes guide rails extending in a vehicle front-rear direction at both edge portions in a vehicle width direction of a roof opening portion formed in a roof of a vehicle, support members supporting a movable panel opening and closing the roof opening portion, and being configured in a movable manner with respect to the guide rails, and driving shoes moving along the guide rails while engaging with the support members. Each of the support members includes a first guide portion and a second guide portion respectively formed on both sides in the vehicle width direction of the support member. Each of the driving shoes includes a first plate being made of metal and including a first engaging portion engaging with the first guide portion, a second plate being made of metal and including a second engaging portion engaging with the second guide portion, and a sliding portion sliding with one of the guide rails. By moving along one of the guide rails with the first engaging portion and the second engaging portion engaging with the first guide portion and the second guide portion, respectively, the driving shoe causes a rear edge portion of the movable panel to ascend or descend via one of the support members, and the first plate and the second plate are coupled to each other in the vehicle width direction by the sliding portion.

A method for manufacturing a driving shoe of a sunroof device that solves the above-described problem is a method for manufacturing a driving shoe of the above-described sunroof device and includes a first forming step of forming the first plate and the second plate individually, an arrangement step of arranging the first plate and the second plate in a die, and a second forming step of, by curing liquid resin injected in the die, forming the sliding portion.

According to an aspect of this disclosure, a sunroof device and a method for manufacturing a driving shoe of the sunroof device enable smooth operation of a movable panel to be achieved.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a vehicle provided with a sunroof device disclosed here will be explained with reference to the attached drawings.

In this embodiment, directions of a sunroof device when the sunroof device is mounted on a vehicle will be used in the explanation. The vehicle width direction, the vehicle font-rear direction, and the vehicle up-down direction are simply referred to as the "width direction", the "front-rear direction", and the "up-down direction", respectively.

Figure 1:
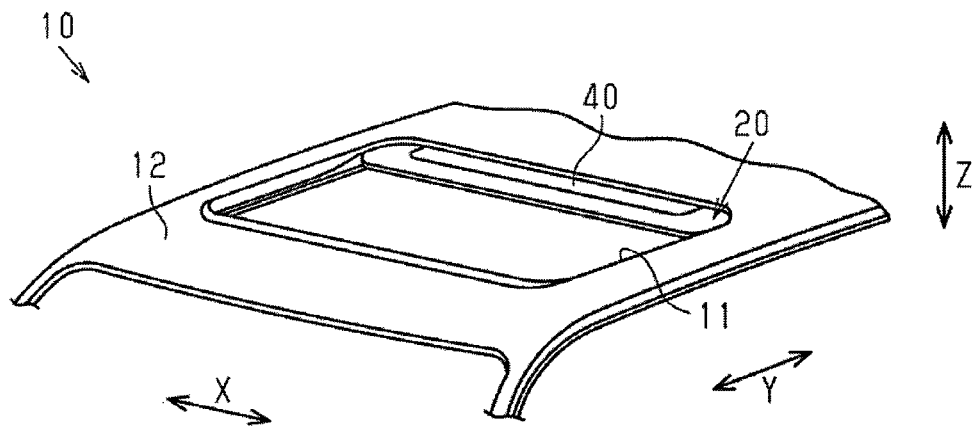
FIG. 1 is a perspective view illustrating a schematic configuration of a roof and surroundings thereof of a vehicle according to one embodiment.

As illustrated in FIG. 1, a vehicle 10 includes a roof 12 to which a roof opening portion 11 is formed and a sunroof device 20 that is mounted in the roof opening portion 11. The roof opening portion 11 is formed into, when viewed in plan from an up-down direction Z, a rectangular shape the lateral direction and the longitudinal direction of which are aligned with a front-rear direction Y and a width direction X, respectively.

Figure 2:
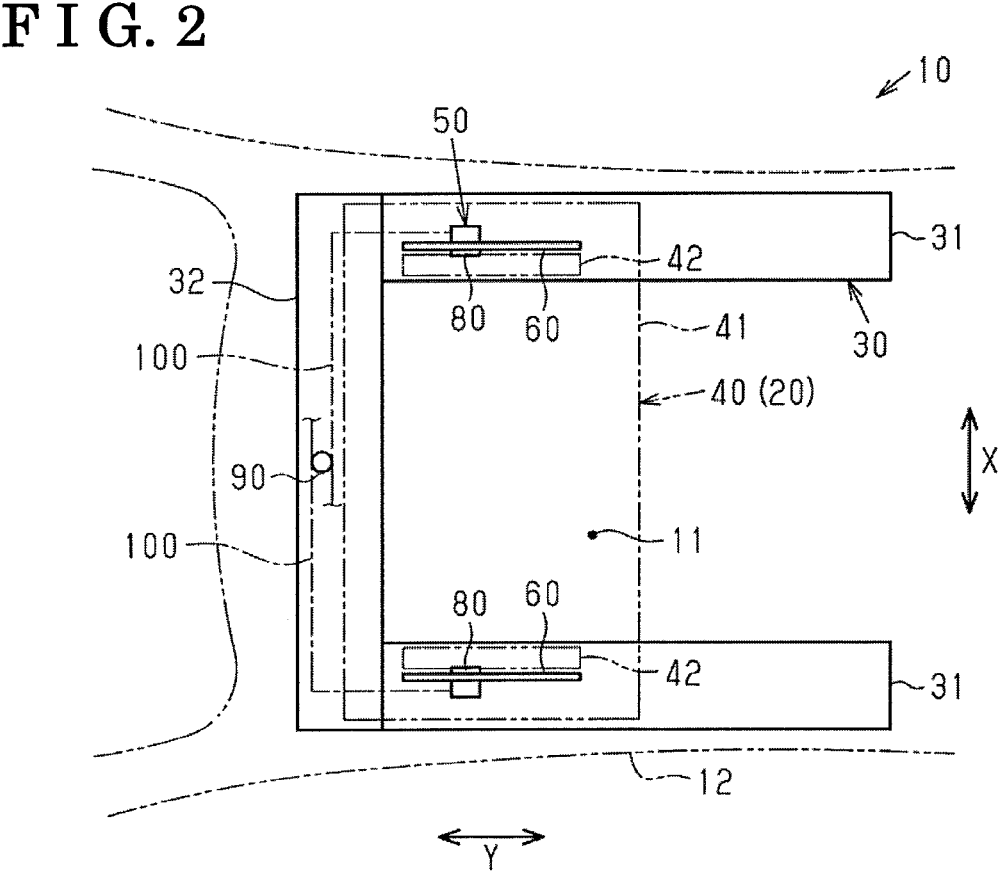
FIG. 2 is a plan view illustrating the schematic configuration of the roof and the surroundings thereof of the vehicle.

As illustrated in FIG. 2, the sunroof device 20 includes a base frame 30 that surrounds the periphery of the roof opening portion 11, a movable panel 40 that opens and closes the roof opening portion 11, and a drive device 50 that drives the movable panel 40.

Next, the base frame 30 will be described.

As illustrated in FIG. 2, the base frame 30 includes a pair of guide rails 31 that extend in the front-rear direction Y at both edge portions in the width direction X of the roof opening portion 11 and a front housing 32 that extends in the width direction X at a front edge portion of the roof opening portion 11.

Figure 3:
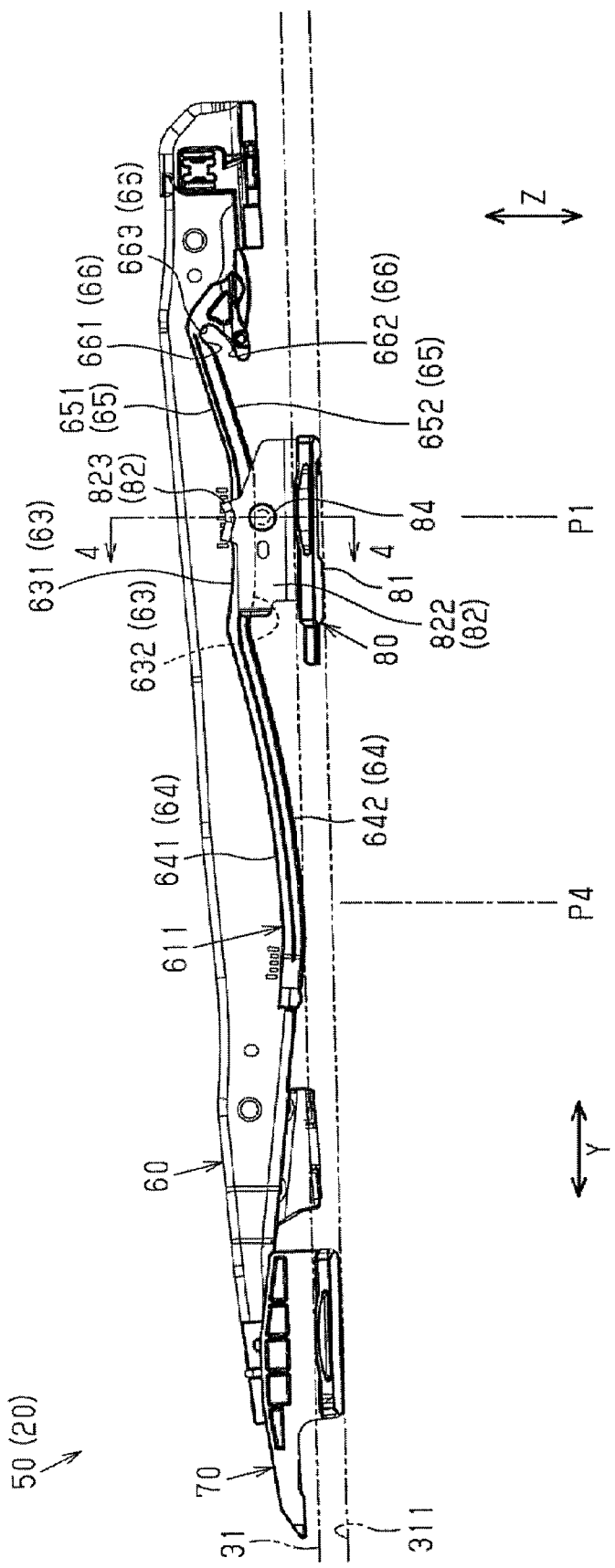
FIG. 3 is a side view of a sunroof device when a movable panel is positioned at a fully closed position.

Each of the guide rails 31 has a uniform cross-sectional shape across the whole length in the longitudinal direction thereof. As illustrated in FIG. 3, to each of the guide rails 31, a sliding groove 311 is formed across the whole length in the longitudinal direction thereof. The guide rails 31 may curve along the shape of the roof 12 of the vehicle 10. That is, it is assumed that examples of the guide rails 31, which extend in the front-rear direction Y, that are dealt with in this embodiment include guide rails having curved shapes. The front housing 32 couples front edge portions of the guide rails 31 to each other in the width direction X. The front housing 32 supports some constituent members of the drive device 50, which will be described later.

Next, the movable panel 40 will be described.

As illustrated in FIG. 2, the movable panel 40 is formed into, when viewed in plan from the up-down direction Z, a rectangular shape the size of which corresponds to the size of the roof opening portion 11. The movable panel 40 includes a translucent panel 41 that has translucency and a pair of fixing brackets 42 that are fixed to the undersurface of the translucent panel 41. The pair of fixing brackets 42 respectively extend along the edges on both sides in the width direction X of the movable panel 40. The translucent panel 41 and the pair of fixing brackets 42 are adhered to each other using, for example, urethane-based adhesive.

The movable panel 40 operates by transitioning among a fully closed position at which the movable panel 40 completely closes the roof opening portion 11, a tilted-up position at which a rear edge portion of the movable panel 40 has ascended higher than at the fully closed position, a tilted-down position at which the rear edge portion of the movable panel 40 has descended lower than at the fully closed position, and a fully open position that is a position more rearward than the tilted-up position and at which the movable panel 40 fully opens the roof opening portion 11. Specifically, the movable panel 40 performs a tilt-up operation from the fully closed position to the tilted-up position and a tilt-down operation from the tilted-up position to the fully closed position. In addition, the movable panel 40 performs a tilt-down operation from the fully closed position to the tilted-down position and a tilt-up operation from the tilted-down position to the fully closed position. Further, the movable panel 40 performs a sliding operation between the tilted-down position and the fully open position.

Note that, as illustrated in FIG. 1, the sunroof device 20 of this embodiment is a so-called inner sliding type sunroof device in which the movable panel 40 is housed in a space between the roof 12 and the vehicle interior at the fully open position.

Next, the drive device 50 will be described.

As illustrated in FIG. 3, the drive device 50 includes a pair of support members 60 that are fixed to the movable panel 40, a pair of driven shoes 70 that respectively move along the pair of guide rails 31, and a pair of driving shoes 80 that respectively move along the pair of guide rails 31. As illustrated in FIG. 2, the drive device 50 includes a motor 90 that is arranged in the front housing 32 and a pair of cables 100 that respectively transmit power of the motor 90 to the pair of driving shoes 80.

First, the support members 60 will be described.

Figure 4:
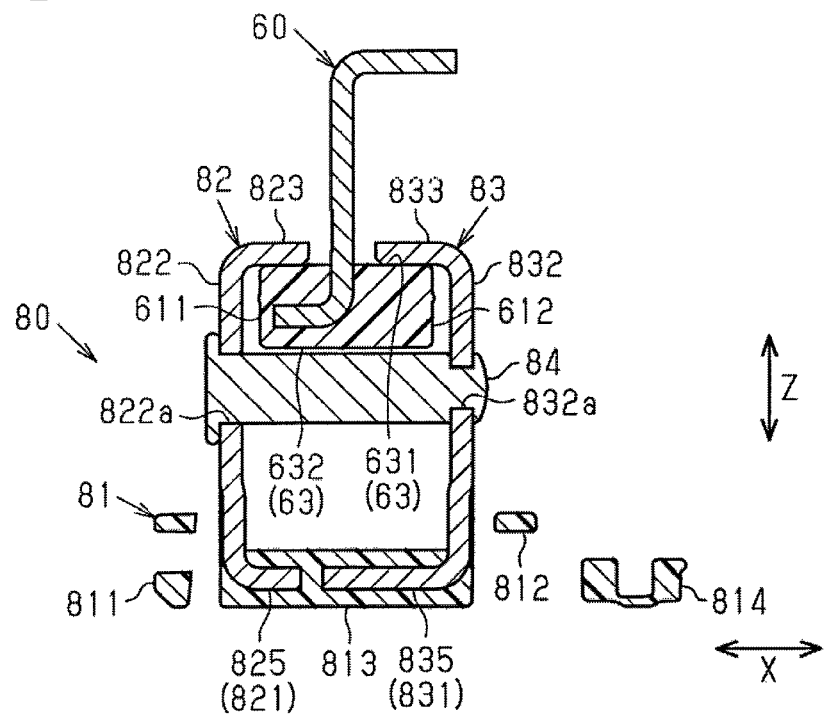
FIG. 4 is a cross-sectional view taken along the arrow line IV-IV in FIG. 3.

As illustrated in FIGS. 3 and 4, the support members 60 are, for example, insert molded bodies that are produced by covering a press-formed metal plate with resin. Each of the support members 60 is formed into a bar shape extending in the front-rear direction Y. As illustrated in FIG. 4, each of the support members 60 includes a first guide portion 611 and a second guide portion 612 that are respectively formed on both sides in the width direction X. The first guide portion 611 and the second guide portion 612 project inward and outward, respectively, in the width direction X. In each of the support members 60, the first guide portion 611 and the second guide portion 612 are portions formed of resin. Since the first guide portion 611 and the second guide portion 612 are formed into shapes symmetrical to each other in the width direction X, the first guide portion 611 illustrated in FIG. 3 will be mainly described in the following description.

As illustrated in FIG. 3, the first guide portion 611 extends in the longitudinal direction of the support member 60. When, as illustrated in FIG. 3, the support member 60 takes such a position as to arrange the movable panel 40 at the fully closed position, the first guide portion 611 includes a flat portion 63 that extends substantially in the front-rear direction Y, a front-side inclined portion 64 that extends downward as it proceeds forward from the front edge of the flat portion 63, and a rear-side inclined portion 65 that extends upward as it proceeds backward from the rear edge of the flat portion 63. The first guide portion 611 also includes a restricting portion 66 that, is disposed in the rear of the rear-side inclined portion 65.

The upper surfaces of the flat portion 63, the front-side inclined portion 64, and the rear-side inclined portion 65 constitute continuous upper-side guide surfaces 631, 641, and 651, respectively, and the lower surfaces of the flat portion 63, the front-side inclined portion 64, and the rear-side inclined portion 65 constitute continuous lower-side guide surfaces 632, 642, and 652, respectively. The upper-side guide surface 631 extends substantially in parallel with the lower-side guide surface 632 on the flat portion 63, the upper-side guide surface 641 extends substantially in parallel with the lower-side guide surface 642 on the front-side inclined portion 64, and the upper-side guide surface 651 extends substantially in parallel with the lower-side guide surface 652 on the rear-side inclined portion 65.

When, as illustrated in FIG. 3, the support member 60 takes such a position as to arrange the movable panel 40 at the fully closed position, the restricting portion 66 is a recessed portion that is recessed in an upward direction as it proceeds backward. The restricting portion 66 includes an upper-side guide surface 661 that continues from the lower-side guide surface 652 of the rear-side inclined portion 65, a lower-side guide surface 662 that extends along the upper-side guide surface 661, and a restricting surface 663 that connects the rear edges of the upper-side guide surface 661 and the lower-side guide surface 662 to each other.

The support members 60 engage with the guide rails 31 via the driven shoes 70. The support members 60 are configured in a movable manner with respect to the guide rails 31 by means of the driven shoes 70 and the driving shoes 80. In addition, the pair of support members 60 are respectively fixed to the pair of fixing brackets 42 of the movable panel 40. That is, the pair of support members 60 support the movable panel 40 along both edges in the width direction X of the movable panel 40.

Succeedingly, the driven shoes 70 will be described.

The driven shoes 70 are formed of, for example, resin. As illustrated in FIG. 3, since the driven shoes 70 engage with the sliding grooves 311 of the guide rails 31, the driven shoes 70 are restricted from moving in the direction crossing at right angles the longitudinal direction of the guide rails 31. The driven shoes 70 support tip portions of the support members 60 in a rotatable manner about an axis extending in the width direction X. In this manner, the support members 60 move along the guide rails 31 in conjunction with the driven shoes 70 and rotate about an axis extending in the width direction X with respect to the driven shoes 70.

Succeedingly, the driving shoes 80 will be described.

Figure 5:
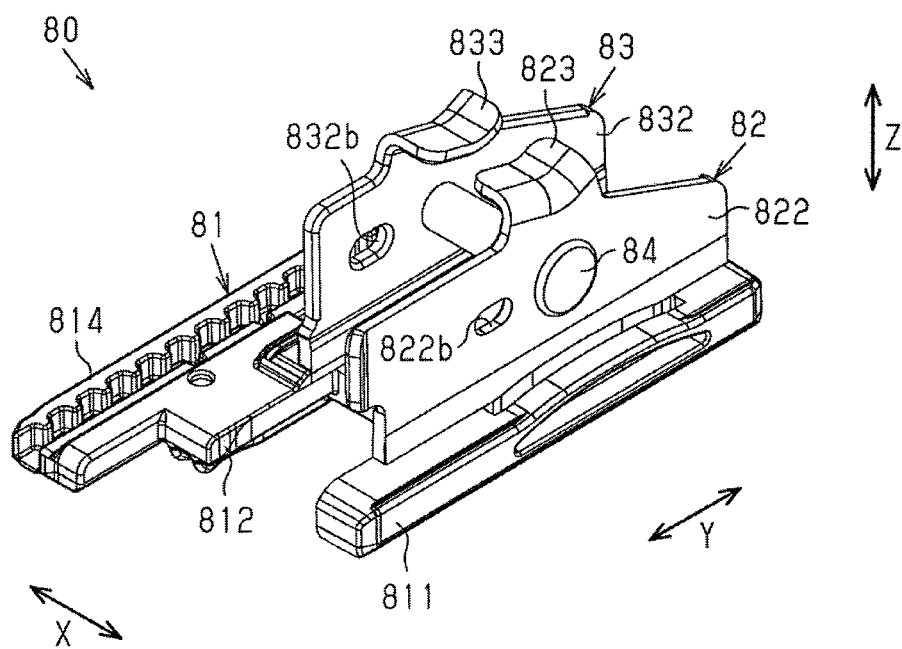
FIG. 5 is a perspective view of a driving shoe of a drive device.

As illustrated in FIG. 5, each of the driving shoes 80 includes a sliding portion 81 that slides with one of the guide rails 31, a first plate 82 and a second plate 83 that constitute a pair in the width direction X, and a guide shaft 84 that couples the first plate 82 and the second plate 83 to each other in the width direction X. Note that each of the driving shoes 80 of this embodiment is, except the guide shaft 84, an insert molded body including the sliding portion 81, which is formed of a resin material, and the first plate 82 and the second plate 83, which are made of a metal material.

Figure 6:
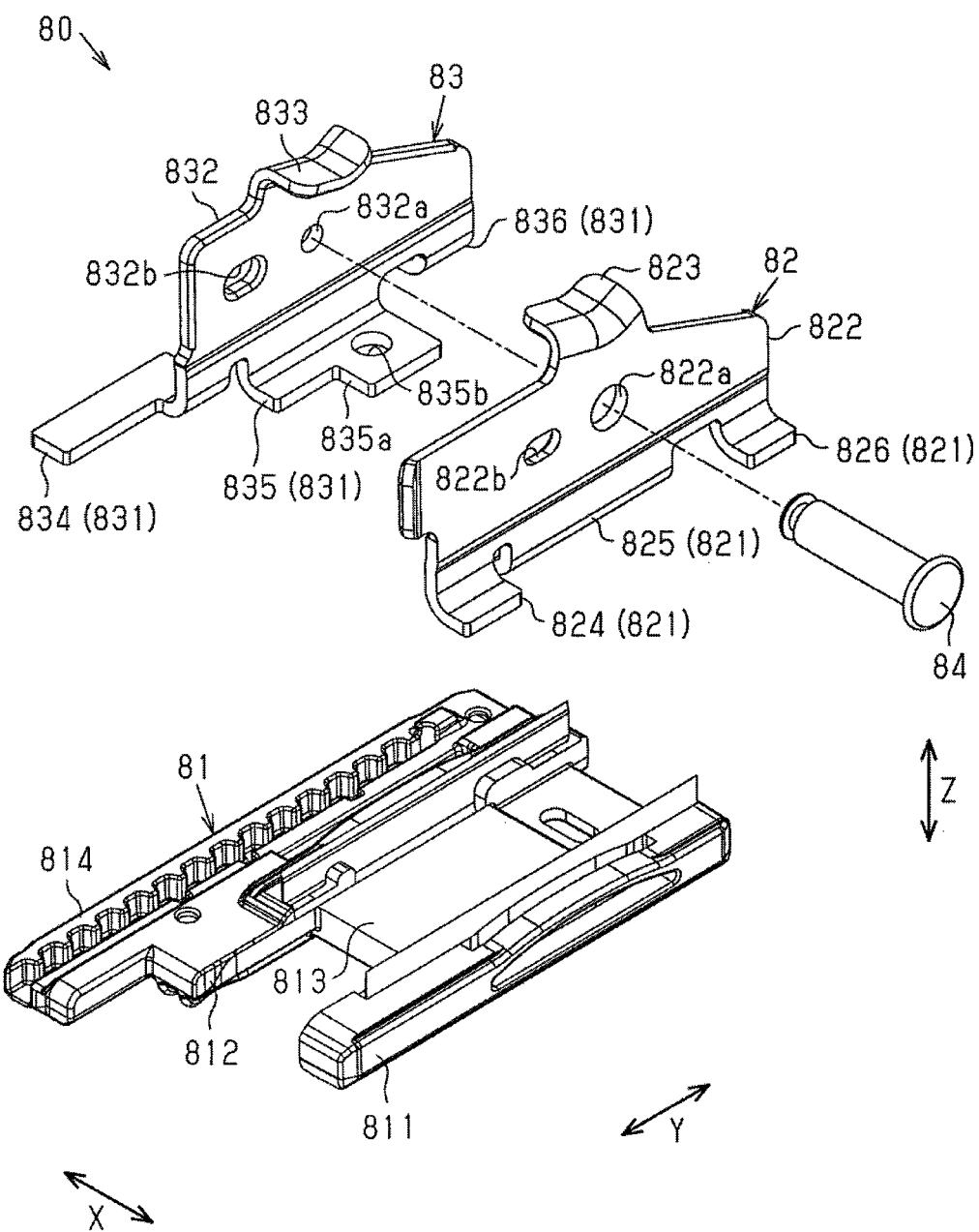
FIG. 6 is an exploded perspective view of the driving shoe of the drive device.
Figure 7:
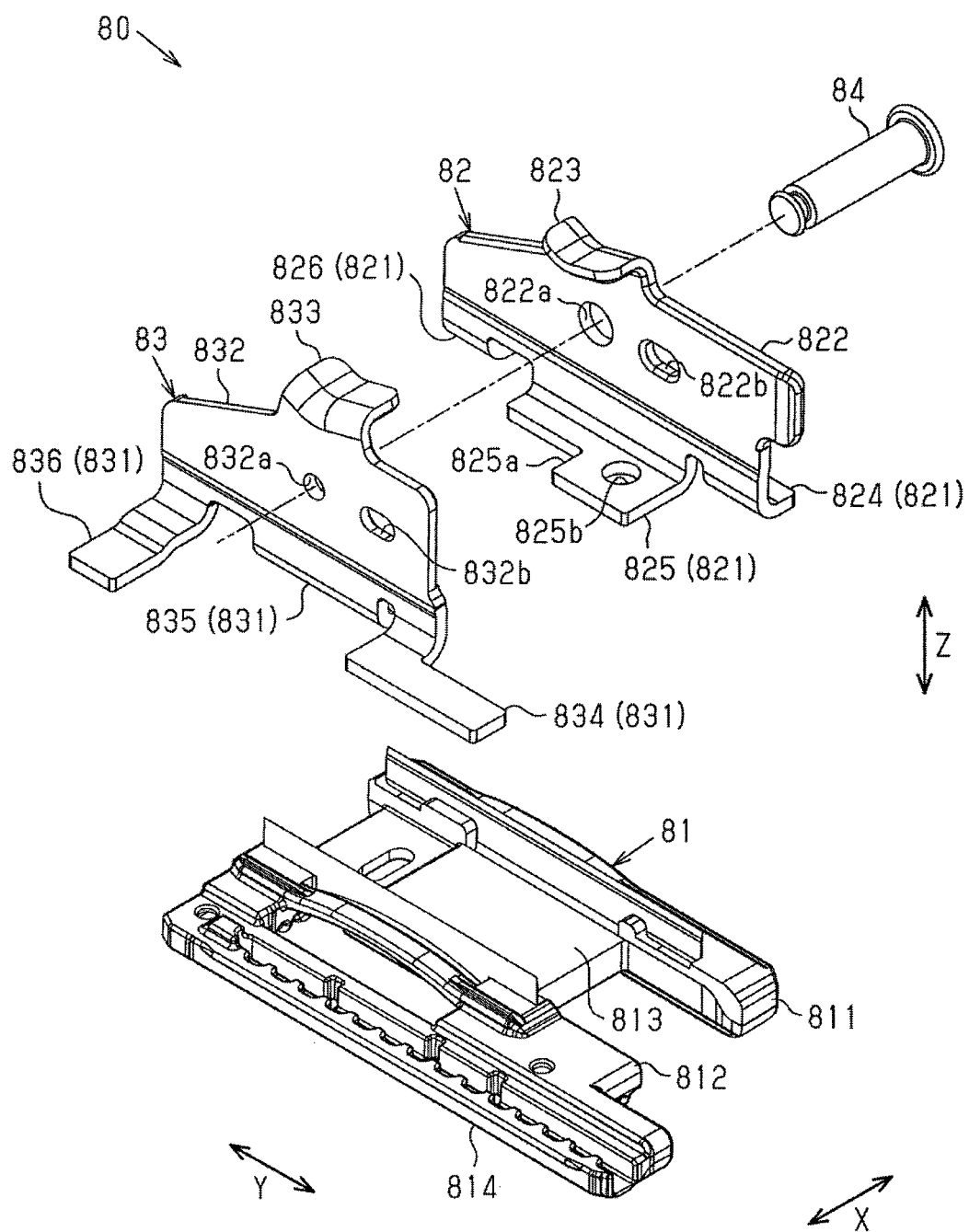
FIG. 7 is another exploded perspective view of the driving shoe of the drive device.

As illustrated in FIGS. 6 and 7, the sliding portion 81 includes a first sliding portion 811 that is arranged inward in the width direction X in the sliding groove 311 of one of the guide rails 31, a second sliding portion 812 that is arranged outward in the width direction X in the sliding groove 311, an intermediate portion 813 that connects the first sliding portion 811 and the second sliding portion 812 to each other in the width direction X, and a cable holding portion 814 that holds one end of one of the cables 100. The first sliding portion 811 and the second sliding portion 812 are formed into substantial rectangular parallelepiped shapes and extend in the front-rear direction Y. The intermediate portion 813 is formed into a substantial flat plate shape.

The first plate 82 and the second plate 83 are formed by performing press working on metal plates. The first plate 82 and the second plate 83 have shapes substantially symmetrical to each other in the width direction X.

As illustrated in FIGS. 6 and 7, the first plate 82 includes first bottom walls 821, a first sidewall 822 that extends upward from the first bottom walls 821, and a first engaging wall 823 that extends in the width direction X from the upper edge of the first sidewall 822. Since the first plate 82 is formed by performing press working on a metal plate, the first bottom walls 821, the first sidewall 822, and the first engaging wall 823 are formed into plate shapes.

The first bottom walls 821 include a first front-side bottom wall 824, a first intermediate bottom wall 825, and a first rear-side bottom wall 826 that bend from the lower edge of the first sidewall 822. The first front-side bottom wall 824 extends from a region closer to the front edge of the first sidewall 822, the first intermediate bottom wall 825 extends from an intermediate portion in the front-rear direction Y of the first sidewall 822, and the first rear-side bottom wall 826 extends from a region closer to the rear edge of the first sidewall 822. In the width direction X, the direction in which the first front-side bottom wall 824 and the first rear-side bottom wall 826 extend is the opposite direction to the direction in which the first intermediate bottom wall 825 extends. The first front-side bottom wall 824, the first intermediate bottom wall 825, and the first rear-side bottom wall 826 are formed with gaps interposed therebetween in the front-rear direction Y. As illustrated in FIG. 7, a first notch 825a is formed in a region closer to the rear edge of the first intermediate bottom wall 825. For this reason, in the first intermediate bottom wall 825, the length in the width direction X of a region closer to the front edge in the front-rear direction Y is longer than the length in the width direction X of a region closer to the rear edge in the front-rear direction Y. On the other hand, a first through-hole 825b is formed in a penetrating manner in the up-down direction Z in a region closer to the front edge of the first intermediate bottom wall 825.

In the first sidewall 822, a first coupling hole 822a and a first engagement hole 822b are formed in a penetrating manner in the width direction X. The first coupling hole 822a and the first engagement hole 822b are formed with a gap interposed therebetween in the front-rear direction Y. The first coupling hole 822a is formed at a position more rearward than the first engagement hole 822b. When viewed from the side in the width direction X, the first coupling hole 822a and the first engagement hole 822b are formed into a circular shape and an elliptical shape, respectively.

The first engaging wall 823 curves in a circular-arc shape when viewed from the side in the width direction X. Specifically, the first engaging wall 823 curves in such a manner that an intermediate portion in the front-rear direction Y is positioned lower than a front edge portion and a rear edge portion. In the width direction X, the direction in which the first engaging wall 823 extends with respect to the first sidewall 822 is the same direction as the direction in which the first intermediate bottom wall 825 extends with respect to the first sidewall 822. In addition, when viewed in plan in the up-down direction Z, the first engaging wall 823 faces the first intermediate bottom wall 825. In this embodiment, the first engaging wall 823 is equivalent to an example of a "first engaging portion".

Similarly, as illustrated in FIGS. 6 and 7, the second plate 83 includes second bottom walls 831, a second sidewall 832 that extends upward from the second bottom walls 831, and a second engaging wall 833 that extends in the width direction X from the upper edge of the second sidewall 832. Since the second plate 83 is formed by performing press working on a metal plate, the second bottom walls 831, the second sidewall 832, and the second engaging wall 833 are formed into plate shapes.

The second bottom walls 831 include a second front-side bottom wall 834, a second intermediate bottom wall 835, and a second rear-side bottom wall 836 that bend from the lower edge of the second sidewall 832. The second front-side bottom wall 834 extends from a region closer to the front edge of the second sidewall 832, the second intermediate bottom wall 835 extends from an intermediate portion in the front-rear direction Y of the second sidewall 832, and the second rear-side bottom wall 836 extends from a region closer to the rear edge of the second sidewall 832. In the width direction X, the direction in which the second front-side bottom wall 834 and the second rear-side bottom wall 836 extend is the opposite direction to the direction in which the second intermediate bottom wall 835 extends. The second front-side bottom wall 834, the second intermediate bottom wall 835, and the second rear-side bottom wall 836 are formed with gaps interposed therebetween in the front-rear direction Y. As illustrated in FIG. 6, a second notch 835*a* is formed in a region closer to the rear edge of the second intermediate bottom wall 835. For this reason, in the second intermediate bottom wall 835, the length in the width direction X of a region closer to the front edge in the front-rear direction Y is shorter than the length in the width direction X of a region closer to the rear edge in the front-rear direction Y. On the other hand, a second through-hole 835*b* is formed in a penetrating manner in the up-down direction Z in a region closer to the front edge of the second intermediate bottom wall 835.

In the second sidewall 832, a second coupling hole 832*a* and a second engagement hole 832*b* are formed in a penetrating manner in the width direction X. The second coupling hole 832*a* and the second engagement hole 832*b* are formed with a gap interposed therebetween in the front-rear direction Y. The second coupling hole 832*a* is formed at a position more rearward than the second engagement hole 832*b*. When viewed from the side in the width direction X, the second coupling hole 832*a* and the second engagement hole 832*b* are formed into a circular shape and an elliptical shape, respectively.

In the first plate 82 and the second plate 83, the inner diameter of the first coupling hole 822*a* is greater than the inner diameter of the second coupling hole 832*a*, and the inner diameter of the first engagement hole 822*b* is equal to the inner diameter of the second engagement hole 832*b*. The axis of the first coupling hole 822*a* and the axis of the second coupling hole 832*a* lie in the same straight line, and the axis of the first engagement hole 822*b* and the axis of the second engagement hole 832*b* lie in the same straight line. For this reason, the inter-axis distance between the first coupling hole 822*a* and the first engagement hole 822*b* is equal to the inter-axis distance between the second coupling hole 832*a* and the second engagement hole 832*b*.

The second engaging wall 833 curves in a circular-arc shape when viewed from the side in the width direction X. Specifically, the second engaging wall 833 curves in such a manner that an intermediate portion in the front-rear direction Y is positioned lower than a front edge portion and a rear edge portion. In the width direction X, the direction in which the second engaging wall 833 extends with respect to the second sidewall 832 is the same direction as the direction in which the second intermediate bottom wall 835 extends with respect to the second sidewall 832. In addition, when viewed in plan in the up-down direction Z, the second engaging wall 833 faces the second intermediate bottom wall 835. In this embodiment, the second engaging wall 833 is equivalent to an example of a "second engaging portion".

The first plate 82 and the second plate 83 are coupled to the sliding portion 81 in the width direction X. Specifically, the first bottom walls 821 of the first plate 82 and the second bottom walls 831 of the second plate 83 being covered by the intermediate portion 813 of the sliding portion 81 causes the first plate 82 and the second plate 83 to be integrated with the sliding portion 81. In other words, the sliding portion 81 integrates with the first plate 82 by covering a portion of the first plate 82 and integrates with the second plate 83 by covering a portion of the second plate 83. In addition, since the first bottom walls 821 are covered by the sliding portion 81, the first through-hole 825*b* is filled with a resin material forming the sliding portion 81. Similarly, since the second bottom walls 831 are covered by the sliding portion 81, the second through-hole 835*b* is filled with a resin material forming the sliding portion 81.

On this occasion, the region of the second intermediate bottom wall 835 in which the second through-hole 835*b* is formed fits into the first notch 825*a* of the first intermediate bottom wall 825, and the region of the first intermediate bottom wall 825 in which the first through-hole 825*b* is formed fits into the second notch 835*a* of the second intermediate bottom wall 835. Between the first intermediate bottom wall 825 and the second intermediate bottom wall 835, a gap is formed across the whole length thereof in the front-rear direction Y. Note that the gap is filled with a resin material forming the sliding portion 81.

The first sidewall 822 of the first plate 82 and the second sidewall 832 of the second plate 83 face each other in the width direction X, and the first engaging wall 823 of the first plate 82 and the second engaging wall 833 of the second plate 83 face each other in the width direction X. On this occasion, a gap is formed between the first engaging wall 823 of the first plate 82 and the second engaging wall 833 of the second plate 83.

The guide shaft 84 couples the first sidewall 822 and the second sidewall 832 to each other in the width direction X. Specifically, the guide shaft 84 couples the first sidewall 822 and the second sidewall 832 to each other by being caulked while being inserted into the first coupling hole 822*a* of the first sidewall 822 and the second coupling hole 832*a* of the second sidewall 832.

The length of an interval in the up-down direction Z between the guide shaft 84 and the first engaging wall 823 of the first plate 82 and the second engaging wall 833 of the second plate 83 is substantially equal to the length in the up-down direction Z of the first guide portion 611 and second guide portion 612 of one of the support members 60. In addition, the outer diameter of the guide shaft 84 is substantially equal to the length of an interval between the upper-side guide surface 661 and lower-side guide surface 662 of the restricting portion 66 of one of the support members 60.

As illustrated in FIG. 3, the sliding portion 81, specifically, the first sliding portion 811 and the second sliding portion 812, being arranged in the sliding groove 311 of one of the guide rails 31 causes each of the driving shoes 80 to be allowed to move in the longitudinal direction of the guide rail 31 and to be restricted from moving in the direction crossing at right angles the longitudinal direction of the guide rail 31. The cables 100 pushing or pulling the sliding portions 81 along the guide rails 31 causes the driving shoes 80 to move along the guide rails 31.

As illustrated in FIG. 4, each of the driving shoes 80 engages with one of the support members 60 by the first guide portion 611 and second guide portion 612 of the support member 60 being inserted into a region surrounded by the first sidewall 822 and second sidewall 832, the first engaging wall 823 and second engaging wall 833, and the guide shaft 84 of the driving shoe 80. Specifically, the first engaging wall 823 and guide shaft 84 of the driving shoe 80 engage with the first guide portion 611 of the support member 60, and the second engaging wall 833 and guide shaft 84 of the driving shoe 80 engage with the second guide portion 612 of the support member 60.

Operation of the sunroof device 20 will be described.

As illustrated in FIG. 3, when each of the driving shoes 80 is positioned at a first position P1, the first engaging wall 823 and second engaging wall 833 of the driving shoe 80 engage with the upper-side guide surface 631 of the flat portion 63 of one of the support members 60 and the guide shaft 84 of the driving shoe 80 engages with the lower-side guide surface 632 of the flat portion 63 of the support member 60. When the driving shoes 80 are positioned at the first position P1, the movable panel 40 is positioned at the fully closed position. In this embodiment, the position of each of the driving shoes 80 is represented by the center position of the guide shaft 84.

Figure 8:
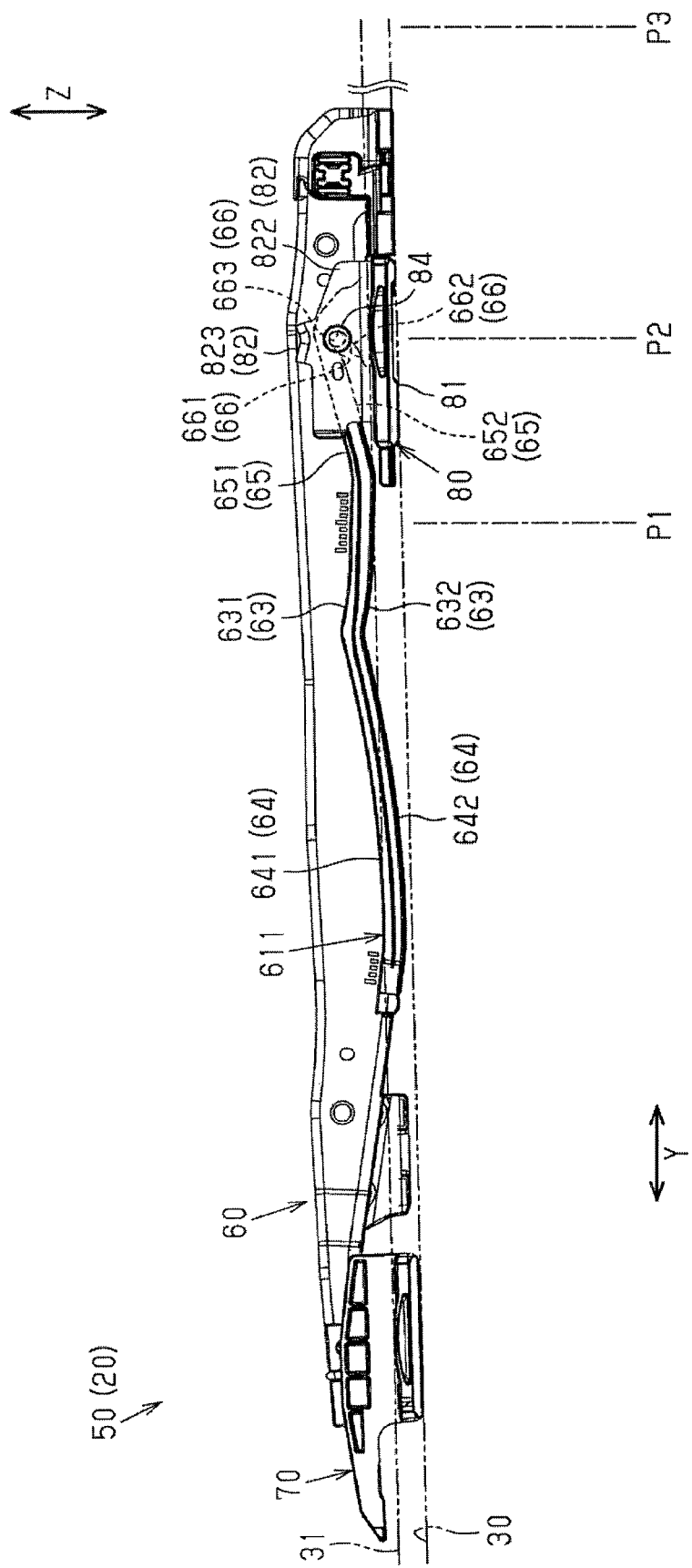
FIG. 8 is a side view of the sunroof device when the movable panel is positioned at a tilted-down position.

As illustrated in FIG. 8, when each of the driving shoes 80 moves rearward from the first position P1, the first engaging wall 823 and second engaging wall 833 of the driving shoe 80 slide with the upper-side guide surface 651 of the rear-side inclined portion 65 of one of the support members 60. On this occasion, the driving shoe 80 moves rearward, pushing down the rear-side inclined portion 65 with the first engaging wall 823 and the second engaging wall 833. Succeedingly, the guide shaft 84 of the driving shoe 80 slides with the lower-side guide surface 662 of the restricting portion 66. On this occasion, the driving shoe 80 moves rearward, pushing down the restricting portion 66 with the guide shaft 84.

Therefore, the support members 60 rotate about front edge portions thereof in such a way that rear edge portions thereof descend with respect to the front edge portions and the movable panel 40 thereby performs a tilt-down operation. As illustrated in FIG. 8, when each of the driving shoes 80 subsequently reaches a second position P2, the guide shaft 84 of the driving shoe 80 comes into contact with the restricting surface 663 of the restricting portion 66 of one of the support members 60 and the driving shoe 80 thus becomes unable to move rearward relatively with respect to the support members 60. When the driving shoes 80 are positioned at the second position P2, the movable panel 40 is positioned at the tilted-down position.

As illustrated in FIG. 8, when the driving shoes 80 move rearward from the second position P2, the support members 60 move rearward in conjunction with the driving shoes 80. For this reason, the support members 60 move rearward along the guide rails 31, and the movable panel 40 performs a sliding operation rearward. When the driving shoes 80 reach a third position P3 that is the rearmost position within a moving range of the driving shoes 80, the movable panel 40 is positioned at the fully open position.

As illustrated in FIG. 8, when the driving shoes 80 move forward from the third position P3, the support members 60 move forward in conjunction with the driving shoes 80. For this reason, the support members 60 move forward along the guide rails 31, and the movable panel 40 performs a sliding operation forward. When the driving shoes 80 reach the second position P2, the movable panel 40 is positioned at the tilted-down position.

As illustrated in FIG. 8, when each of the driving shoes 80 moves forward from the second position P2, the guide shaft 84 of the driving shoe 80 slides with the upper-side guide surface 661 of the restricting portion 66. On this occasion, the driving shoe 80 moves forward, pushing up the restricting portion 66 with the guide shaft 84. Succeedingly, the guide shaft 84 of the driving shoe 80 slides with the lower-side guide surface 652 of the rear-side inclined portion 65 of one of the support members 60. On this occasion, the driving shoe 80 moves forward, pushing up the rear-side inclined portion 65 with the guide shaft 84.

Therefore, the support members 60 rotate about the front edge portions thereof in such a way that the rear edge portions thereof ascend with respect to the front edge portions and the movable panel 40 thereby performs a tilt-up operation. When the driving shoes 80 reach the first position P1, the movable panel 40 is positioned at the fully closed position.

Although illustration is omitted, when each of the driving shoes 80 moves forward from the first position P1, the guide shaft 84 of the driving shoe 80 slides with the lower-side guide surface 642 of the front-side inclined portion 64 of one of the support members 60. On this occasion, the driving shoe 80 moves forward, pushing up the front-side inclined portion 64 with the guide shaft 84. For this reason, the support members 60 rotate about the front edge portions thereof in such a way that the rear edge portions thereof ascend with respect to the front edge portions and the movable panel 40 thereby performs a tilt-up operation. When the driving shoes 80 reach a fourth position P4 illustrated in FIG. 3, the movable panel 40 is positioned at the tilted-up position.

On the other hand, when each of the driving shoes 80 moves rearward from the fourth position P4, the first engaging wall 823 and second engaging wall 833 of the driving shoe 80 slide with the upper-side guide surface 641 of the front-side inclined portion 64 of one of the support members 60. On this occasion, the driving shoe 80 moves rearward, pushing down the front-side inclined portion 64 with the first engaging wall 823 and the second engaging wall 833. For this reason, the support members 60 rotate about the front edge portions thereof in such a way that the rear edge portions thereof descend with respect to the front edge portions and the movable panel 40 thereby performs a tilt-down operation. When the driving shoes 80 reach the first position P1, the movable panel 40 is positioned at the fully closed position.

Next, a core 110, which is used in insert molding of each of the driving shoes 80, will be described.

Figure 9:
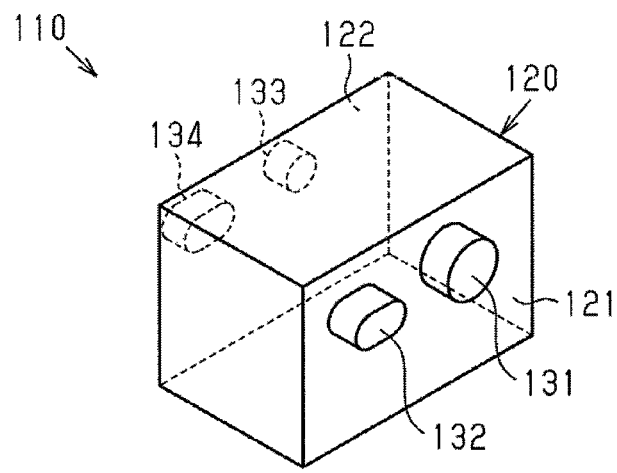
FIG. 9 is a perspective view of a core used in insert molding.

As illustrated in FIG. 9, the core 110 includes a core body 120 having a pair of a first side surface 121 and a second side surface 122, a first engaging shaft 131 and a second engaging shaft 132 that project from the first side surface 121, and a third engaging shaft 133 and a fourth engaging shaft 134 that project from the second side surface 122.

The core body 120 is formed into a substantial rectangular parallelepiped shape. The first side surface 121 and the second side surface 122 are surfaces facing in the opposite directions to each other on the core 110. The distance between the first side surface 121 and second side surface 122 of the core 110 is equal to the distance between the first sidewall 822 of the first plate 82 and the second sidewall 832 of the second plate 83 of each of the driving shoes 80.

The first engaging shaft 131, the second engaging shaft 132, the third engaging shaft 133, and the fourth engaging shaft 134 are preferably configured to be relatively movable with respect to the core body 120. For example, the first engaging shaft 131 and the second engaging shaft 132 are preferably configured to be freely detachable from the first side surface 121. Alternatively, the first engaging shaft 131 and the second engaging shaft 132 are preferably configured to be displaceable between projection positions to which the first engaging shaft 131 and the second engaging shaft 132 project out of the first side surface 121 and retraction positions at which the first engaging shaft 131 and the second engaging shaft 132 retract to the inside of the core 110 and thereby do not project out of the first side surface 121. The third engaging shaft 133 and the fourth engaging shaft 134 are preferably configured in a similar manner to the above in respect of a relationship with the second side surface 122.

The cross-sectional shape of the first engaging shaft 131 is substantially the same as the cross-sectional shape of the first coupling hole 822a of a first plate 82, and the cross-sectional shape of the second engaging shaft 132 is substantially the same as the cross-sectional shape of the first engagement hole 822b of the first plate 82. In addition, the cross-sectional shape of the third engaging shaft 133 is substantially the same as the cross-sectional shape of the second coupling hole 832a of a second plate 83, and the cross-sectional shape of the fourth engaging shaft 134 is substantially the same as the cross-sectional shape of the second engagement hole 832b of the second plate 83.

The axis of the first engaging shaft 131 and the axis of the third engaging shaft 133 lie in the same straight line, and the axis of the second engaging shaft 132 and the axis of the fourth engaging shaft 134 lie in the same straight line. For this reason, the inter-axis distance between the first engaging shaft 131 and the second engaging shaft 132 is equal to the inter-axis distance between the third engaging shaft 133 and the fourth engaging shaft 134. In addition, the inter-axis distances are equal to the inter-axis distance between the first coupling hole 822a and the first engagement hole 822b and are equal to the inter-axis distance between the second coupling hole 832a and the second engagement hole 832b.

Operation of this embodiment will be described.

Specifically, using the cross-section of a driving shoe 80 illustrated in FIG. 4, a method for manufacturing a driving shoe 80 of the sunroof device 20 will be described.

The method for manufacturing the driving shoe 80 of this embodiment includes a first forming step, an arrangement step, a second forming step, and a coupling step. The first forming step, the arrangement step, the second forming step, and the coupling step are steps performed in this order.

The first forming step is a step of individually forming a first plate 82 and a second plate 83. Specifically, the first forming step is a step of, by performing press working on flat plate-shaped metal plates, individually forming the first plate 82 and the second plate 83.

Figure 10:
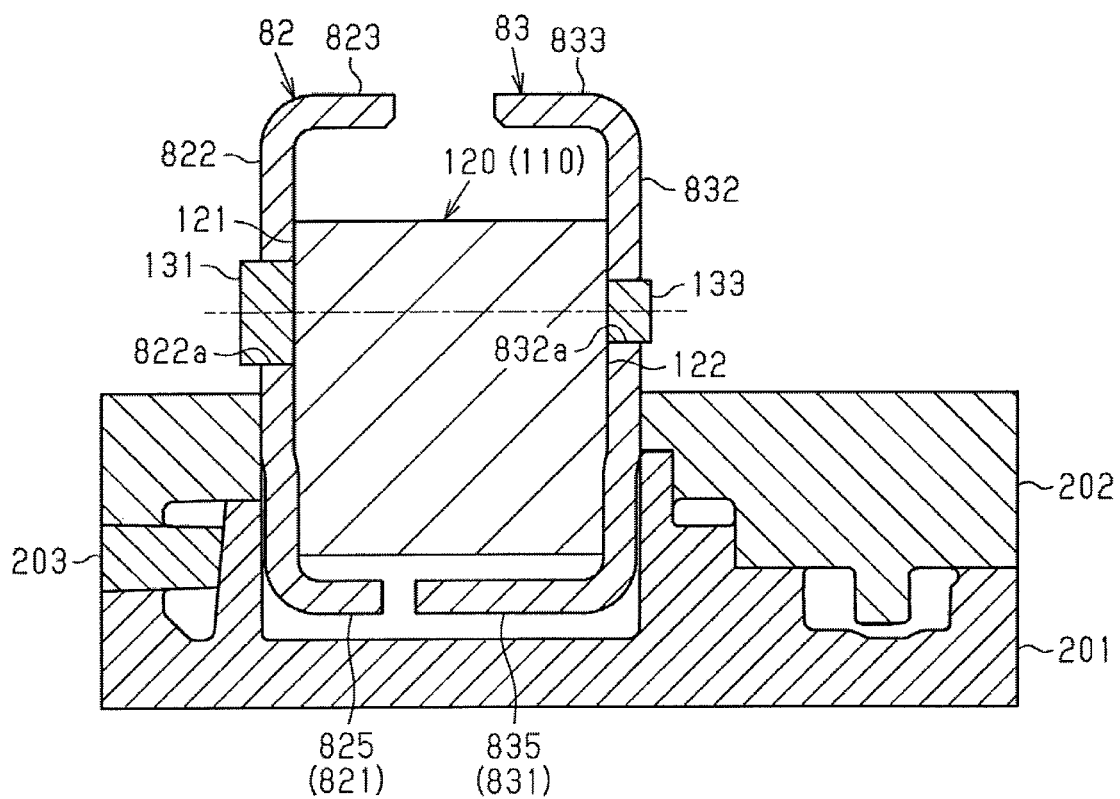
FIG. 10 is a cross-sectional view illustrating an arrangement step in a method for manufacturing the driving shoe.

As illustrated in FIG. 10, the arrangement step is a step of arranging the first plate 82 and the second plate 83 formed in the first forming step in dies 201 to 203. In the arrangement step, the first plate 82 and the second plate 83 are arranged in the dies 201 to 203 with a core 110 interposed between the first sidewall 822 and the second sidewall 832. That is, since the first plate 82 comes into contact with the first side surface 121 of the core 110 and the second plate 83 also comes into contact with the second side surface 122 of the core 110, distance in the width direction X between the first plate 82 and the second plate 83 is fixed.

Further, in the arrangement step, as illustrated in FIG. 10, the first engaging shaft 131 and third engaging shaft 133 of the core 110 are inserted into the first coupling hole 822a of the first plate 82 and the second coupling hole 832a of the second plate 83, respectively. In addition, although illustration is omitted, the second engaging shaft 132 and fourth engaging shaft 134 of the core 110 are inserted into the first engagement hole 822b of the first plate 82 and the second engagement hole 832b of the second plate 83, respectively. As a result, in the arrangement step, the axis of the first coupling hole 822a of the first plate 82 and the axis of the second coupling hole 832a of the second plate 83 coincide with each other, and the axis of the first engagement hole 822b of the first plate 82 and the axis of the second engagement hole 832b of the second plate 83 also coincide with each other.

Figure 11:
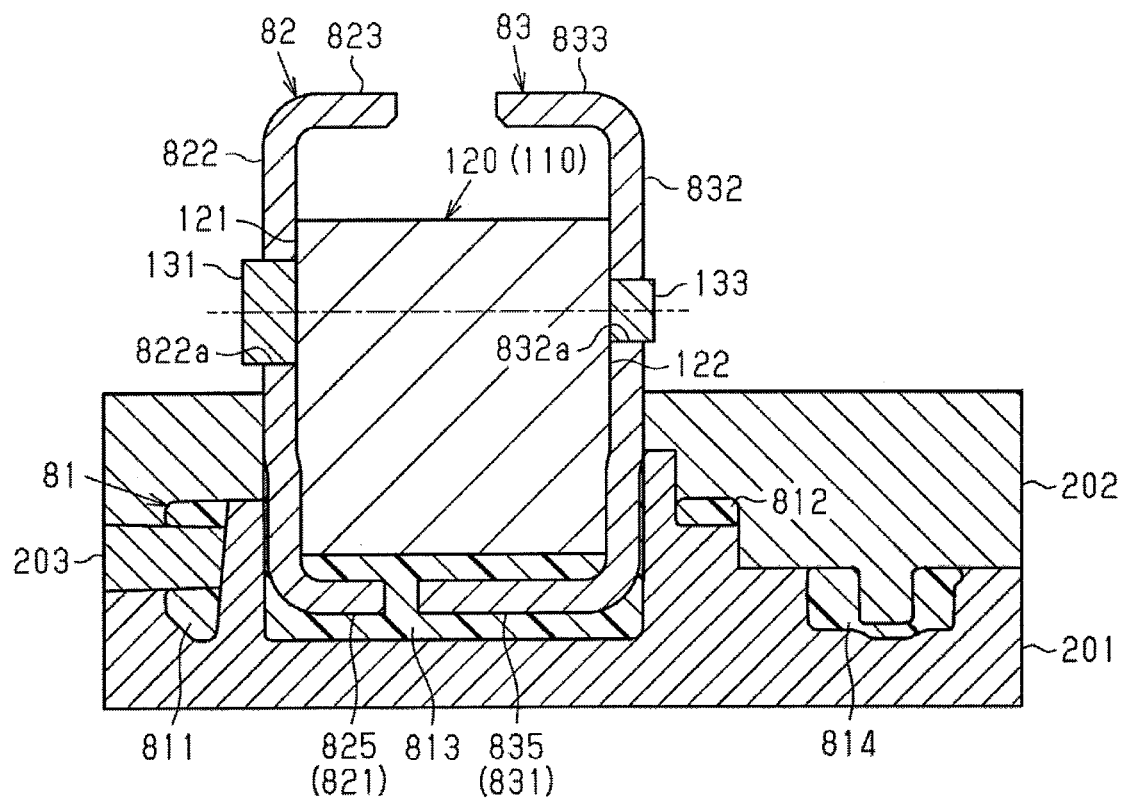
FIG. 11 is a cross-sectional view illustrating a second forming step in the method for manufacturing the driving shoe.

As illustrated in FIG. 11, the second forming step is a step of, by curing liquid resin injected in the dies 201 to 203, forming the sliding portion 81. That is, the second forming step can also be said to be a step of coupling the first plate 82 and the second plate 83, which are arranged in the dies 201 to 203, to each other with the sliding portion 81. In the second forming step, the first bottom walls 821 of the first plate 82 and the second bottom walls 831 of the second plate 83 and a portion of the first sidewall 822 of the first plate 82 and a portion of the second sidewall 832 of the second plate 83 are covered by the sliding portion 81. On this occasion, the first through-hole 825b of the first bottom walls 821 and the second through-hole 835b of the second bottom walls 831 are filled with a resin material forming the sliding portion 81.

In addition, in the second forming step, after the liquid resin is cured, the integrated first plate 82, second plate 83, and sliding portion 81 is removed from the dies 201 to 203. On this occasion, the core 110 is removed from between the first plate 82 and the second plate 83 with the first engaging shaft 131 and the second engaging shaft 132 prevented from projecting out of the first side surface 121 and with the third engaging shaft 133 and the fourth engaging shaft 134 prevented from projecting out of the second side surface 122.

Figure 12:
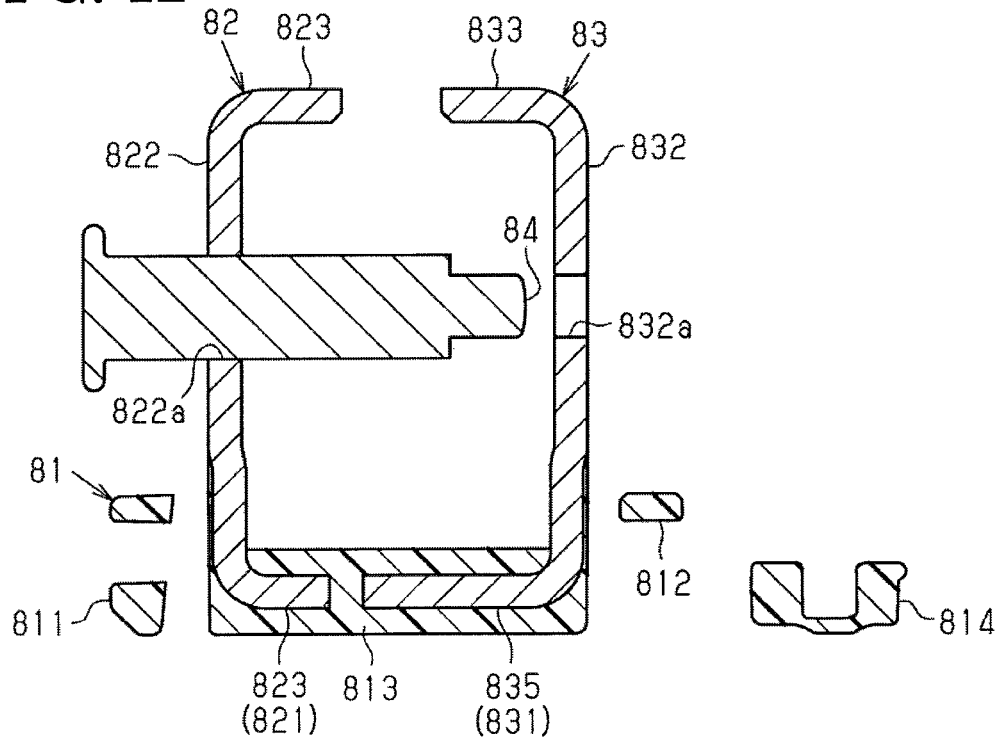
FIG. 12 is a cross-sectional view illustrating a coupling step in the method for manufacturing the driving shoe.

As illustrated in FIG. 12, the coupling step is a step of, after the second forming step, inserting a guide shaft 84 into the first coupling hole 822a formed in the first plate 82 and the second coupling hole 832a formed in the second plate 83 and thereby coupling the first plate 82 and the second plate 83 to each other.

In this manner, through the first forming step, the arrangement step, the second forming step, and the coupling step, a driving shoe 80 is manufactured.

Advantageous effects of this embodiment will be described.

(1) In the sunroof device 20, each of the driving shoes 80 is configured by coupling the first plate 82 and the second plate 83 to each other with the sliding portion 81. Since, for this reason, the first plate 82 and the second plate 83 can be individually formed, it becomes possible to increase forming precision of the first plate 82 and the second plate 83. Specifically, it becomes possible to increase precision relating to the shapes of the first engaging wall 823 and the second engaging wall 833, the positional relationship between the first engaging wall 823 and the second engaging wall 833, and the positional relationship between the first coupling hole 822a and the second coupling hole 832a. Therefore, sliding resistance when the first engaging wall 823 and second engaging wall 833 of the driving shoe 80 slide with the first guide portion 611 and second guide portion 612 of one of the support members 60 is likely to be reduced. As a result, the sunroof device 20 enables smooth opening and closing operations of the movable panel 40 to be achieved.

When the first plate 82 and the second plate 83 are formed integrally with each other, that is, an integrated plate of the first plate 82 and the second plate 83 is formed from a sheet of metal plate, the number of process steps required for the formation is likely to increase or it becomes required to, after the formation, perform fine adjustment of the shape of the integrated plate because the shape becomes complicated. In this respect, the method for manufacturing the driving shoe 80 of this embodiment, because of the first plate 82 and the second plate 83 being formed as separate entities, enables the driving shoe 80 to be manufactured in fewer process steps with high precision.

(2) In the sunroof device 20, the first plate 82 and the second plate 83 constituting a driving shoe 80 are integrated with the sliding portion 81 by means of insert molding. For this reason, it is not required to dispose a structure for assembling the first plate 82 and the second plate 83 to the sliding portion 81. That is, the sunroof device 20 enables the configuration of the driving shoe 80 to be simplified.

(3) In the sunroof device 20, to the first bottom walls 821 of the first plate 82 and the second bottom walls 831 of the second plate 83, the first through-hole 825*b* and the second through-hole 835*b*, which are to be filled with a resin material forming the sliding portion 81, are formed, respectively. For this reason, the sunroof device 20 enables the first plate 82 and the second plate 83 to be connected to the sliding portion 81 firmly. Therefore, when a load is exerted on the driving shoe 80 in the front-rear direction Y, the sunroof device 20 enables the first plate 82 and the second plate 83 to be prevented from separating from the sliding portion 81.

(4) In the arrangement step, the above-described method for manufacturing the driving shoe 80 inserts the first engaging shaft 131, second engaging shaft 132, third engaging shaft 133, and fourth engaging shaft 134 of the core 110 into the first coupling hole 822*a* of the first plate 82, the first engagement hole 822*b* of the first plate 82, the second coupling hole 832*a* of the second plate 83, and the second engagement hole 832*b* of the second plate 83, respectively. For this reason, the above-described method for manufacturing the driving shoe 80 enables the first plate 82 and the second plate 83 to be integrated with the sliding portion 81 in the second forming step with the axis of the first coupling hole 822*a* of the first plate 82 coinciding with the axis of the second coupling hole 832*a* of the second plate 83. Therefore, in the coupling step of coupling the first plate 82 and the second plate 83 to each other with the guide shaft 84, the method for manufacturing the driving shoe 80 enables the guide shaft 84 to be suppressed from becoming difficult to be inserted into the first coupling hole 822*a* and the second coupling hole 832*a*.

This embodiment can be embodied by being modified as follows. This embodiment and the following modifications can be embodied by being combined with one another unless technically contradicting one another.

The sunroof device 20 can also be configured as a so-called outer sliding type sunroof device in which the movable panel 40 is positioned above the roof 12 at the fully open position.

The mode of engagement of the first engaging wall 823 and second engaging wall 833 of each of the driving shoes 80 with the first guide portion 611 and second guide portion 612 of one of the support members 60 can be appropriately modified. For example, the first engaging wall 823 and the second engaging wall 833 may be replaced with a first engaging shaft and a second engaging shaft that are formed into shaft shapes with the width direction X as the axial direction. In this case, the first guide portion 611 and the second guide portion 612 are preferably formed into shapes including grooves that engage with the first engaging shaft and the second engaging shaft, respectively.

In the first plate 82, the first intermediate bottom wall 825 does not have to have the first through-hole 825*b*. Similarly, in the second plate 83, the second intermediate bottom wall 835 does not have to have the second through-hole 835*b*. In this case, by forming grooves or irregularities on the first bottom walls 821 of the first plate 82 and the second bottom walls 831 of the second plate 83, contact area between the first plate 82 and second plate 83 and the sliding portion 81 may be increased.

The first plate 82 and the second plate 83 do not have to be integrated with the sliding portion 81 by means of insert molding. In this case, a structure for assembling the first plate 82 and the second plate 83 to the sliding portion 81 is preferably devised. The above-described advantageous effect (1) of this embodiment can also be attained by the structure.

The arrangement step may make the axis of the first coupling hole 822*a* of the first plate 82 coincide with the axis of the second coupling hole 832*a* of the second plate 83 by, for example, contacting the first engaging wall 823 of the first plate 82 and the second engaging wall 833 of the second plate 83 with the core 110 or the dies 201 to 203. That is, the arrangement step may make the axis of the first coupling hole 822*a* of the first plate 82 coincide with the axis of the second coupling hole 832*a* of the second plate 83 without using the first engaging shaft 131, second engaging shaft 132, third engaging shaft 133, and fourth engaging shaft 134 of the core 110.

The shape of the core 110 may be appropriately modified. For example, the core 110 does not have to have the second engaging shaft 132 and the fourth engaging shaft 134 as long as having the first engaging shaft 131 and the third engaging shaft 133 or does not have to have the first engaging shaft 131 and the third engaging shaft 133 as long as having the second engaging shaft 132 and the fourth engaging shaft 134. In addition, the core 110 may have a configuration enabling the core body 120 to be disassembled after the completion of the forming step in order to facilitate removal of the core 110 from between the first plate 82 and the second plate 83.

The core 110 does not have to have the first engaging shaft 131, the second engaging shaft 132, the third engaging shaft 133, and the fourth engaging shaft 134. That is, the core 110 only have to have at least a function of only fixing a distance in the width direction X between the first plate 82 and the second plate 83.

A sunroof device that solves the above-described problem includes guide rails extending in a vehicle front-rear direction at both edge portions in a vehicle width direction of a roof opening portion formed in a roof of a vehicle, support members supporting a movable panel opening and closing the roof opening portion, and being configured in a movable manner with respect to the guide rails, and driving shoes moving along the guide rails while engaging with the support members. Each of the support members includes a first guide portion and a second guide portion respectively formed on both sides in the vehicle width direction of the support member. Each of the driving shoes includes a first plate being made of metal and including a first engaging portion engaging with the first guide portion, a second plate being made of metal and including a second engaging portion engaging with the second guide portion, and a sliding portion sliding with one of the guide rails. By moving along one of the guide rails with the first engaging portion and the second engaging portion engaging with the first guide portion and the second guide portion, respectively, the driving shoe causes a rear edge portion of the movable panel to ascend or descend via one of the support members, and the first plate and the second plate are coupled to each other in the vehicle width direction by the sliding portion.

In the sunroof device configured as described above, each of the driving shoes is configured by coupling the first plate and the second plate to each other with the sliding portion. Since, for this reason, the first plate and the second plate can be individually formed, it becomes possible to increase forming precision of the first engaging portion and the second engaging portion. Therefore, the sunroof device enables smooth operation of the movable panel to be achieved.

In the above-described sunroof device, the sliding portion may be formed of a resin material and then integrate with the first plate by covering a part of the first plate and integrate with the second plate by covering a part of the second plate.

According to the above-described configuration, when the first plate and second plate and the sliding portion are integrated with each other, it is not required to dispose, to the sliding portion or the like, a structure for assembling the first plate and the second plate to the sliding portion. In other words, the sunroof device enables the configuration of the driving shoe to be simplified.

In the above-described sunroof device, to the first plate and the second plate, a first through-hole and a second through-hole may be formed, respectively, in a direction crossing the vehicle front-rear direction, and the first through-hole and the second through-hole may be filled with a resin material forming the sliding portion.

The sunroof device configured as described above enables the first plate and second plate and the sliding portion to be connected to each other firmly because the first through-hole and the second through-hole are filled with a resin material forming the sliding portion. For this reason, when moving the driving shoe along the guide rail causes a load in the vehicle front-rear direction to be exerted on the sliding portion, the sunroof device enables the first plate and the second plate to be prevented from separating from the sliding portion.

A method for manufacturing a driving shoe of a sunroof device that solves the above-described problem is a method for manufacturing a driving shoe of the above-described sunroof device and includes a first forming step of forming the first plate and the second plate individually, an arrangement step of arranging the first plate and the second plate in a die, and a second forming step of, by curing liquid resin injected in the die, forming the sliding portion.

The method for manufacturing the driving shoe being configured as described above enables, because of individually forming the first plate and the second plate, forming precision of the first plate and the second plate to be increased. Therefore, the method for manufacturing the driving shoe enables the first engaging portion and second engaging portion of the driving shoe to be formed with high precision. In addition, the method for manufacturing the driving shoe enables, because of resin-forming the sliding portion to which the first plate and the second plate are coupled, the driving shoe to be manufactured easily compared with a case of assembling the first plate and the second plate to the sliding portion formed as a separate entity.

In the above-described method for manufacturing the driving shoe of the sunroof device, the sunroof device may be a sunroof device including a guide shaft for coupling the first plate and the second plate to each other in the vehicle width direction, the method may include a coupling step of, after the second forming step, by inserting the guide shaft into a first coupling hole formed in the first plate and a second coupling hole formed in the second plate, coupling the first plate and the second plate to each other, and the arrangement step may arrange the first plate and the second plate in the die in such a way that an axis of the first coupling hole of the first plate coincides with an axis of the second coupling hole of the second plate.

According to the method for manufacturing the driving shoe being configured as described above, the first plate and the second plate are integrated with the sliding portion with the axis of the first coupling hole of the first plate coinciding with the axis of the second coupling hole of the second plate. For this reason, in the coupling step, the method for manufacturing the driving shoe enables insertion of the guide shaft into the first coupling hole and the second coupling hole to be facilitated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof device comprising:
    guide rails extending in a vehicle front-rear direction at both edge portions in a vehicle width direction of a roof opening portion formed in a roof of a vehicle;
    support members supporting a movable panel opening and closing the roof opening portion, and being configured in a movable manner with respect to the guide rails; and
    driving shoes moving along the guide rails while engaging with the support members, wherein
    each of the support members includes a first guide portion and a second guide portion respectively formed on both sides in the vehicle width direction of the support member,
    each of the driving shoes includes a first plate being made of metal and including a first engaging portion engaging with the first guide portion, a second plate being made of metal and including a second engaging portion engaging with the second guide portion, and a sliding portion sliding with one of the guide rails, and, by moving along one of the guide rails with the first engaging portion and the second engaging portion engaging with the first guide portion and the second guide portion, respectively, causes a rear edge portion of the movable panel to ascend or descend via one of the support members,
    the first plate and the second plate are coupled to each other in the vehicle width direction by the sliding portion, the first plate includes a first sidewall defining a first coupling hole and a first engagement hole each extending through the first sidewall along the vehicle width direction, the second plate includes a second sidewall defining a second coupling hole and a second engagement hole each extending through the second sidewall along the vehicle width direction, and each of the first coupling hole and the second coupling hole is configured to receive a guide shaft.

2. The sunroof device according to claim 1, wherein:

the sliding portion is formed of a resin material, and the first plate, the second plate, and the sliding portion are insert molded together such that the sliding portion covers a part of the first plate and covers a part of the second plate so as to integrate the sliding portion with the first plate and the second plate and to couple the first plate and the second plate to one another.

3. The sunroof device according to claim 2, wherein in the first plate and the second plate, a first through-hole and a second through-hole are formed, respectively, in a direction crossing the vehicle front-rear direction, and the first through-hole and the second through-hole are filled with the resin material forming the sliding portion.

4. A method for manufacturing a driving shoe of the sunroof device according to claim 1, the method comprising:

a first forming step of forming the first plate and the second plate individually;

an arrangement step of arranging the first plate and the second plate in a die; and a second forming step of, by curing liquid resin injected in the die, forming the sliding portion.

5. A method for manufacturing a driving shoe of the sunroof device according to claim 2, the method comprising:

a first forming step of forming the first plate and the second plate individually;

an arrangement step of arranging the first plate and the second plate in a die; and a second forming step of, by curing liquid resin injected in the die, forming the sliding portion, wherein in the second forming step, the first plate, the second plate, and the sliding portion are insert molded together.

6. A method for manufacturing a driving shoe of the sunroof device according to claim 3, the method comprising:

a first forming step of forming the first plate and the second plate individually;

an arrangement step of arranging the first plate and the second plate in a die; and a second forming step of, by curing liquid resin injected in the die, forming the sliding portion, wherein in the second forming step, the first plate, the second plate, and the sliding portion are insert molded together and the liquid resin fills the first through-hole and the second through-hole.

7. The method for manufacturing the driving shoe of the sunroof device according to claim 4, wherein the sunroof device is a sunroof device including the guide shaft, the guide shaft coupling the first plate and the second plate to each other in the vehicle width direction, the method further comprises a coupling step of, after the second forming step, by inserting the guide shaft into a first coupling hole formed in the first plate and a second coupling hole formed in the second plate, coupling the first plate and the second plate to each other, and the arrangement step arranges the first plate and the second plate in the die in such a way that an axis of the first coupling hole of the first plate coincides with an axis of the second coupling hole of the second plate.

8. The method for manufacturing the driving shoe of the sunroof device according to claim 5, wherein the sunroof device is a sunroof device including the guide shaft, the guide shaft coupling the first plate and the second plate to each other in the vehicle width direction, the method further comprises a coupling step of, after the second forming step, by inserting the guide shaft into a first coupling hole formed in the first plate and a second coupling hole formed in the second plate, coupling the first plate and the second plate to each other, and the arrangement step arranges the first plate and the second plate in the die in such a way that an axis of the first coupling hole of the first plate coincides with an axis of the second coupling hole of the second plate.

9. The method for manufacturing the driving shoe of the sunroof device according to claim 6, wherein the sunroof device is a sunroof device including the guide shaft, the guide shaft coupling the first plate and the second plate to each other in the vehicle width direction, the method further comprises a coupling step of, after the second forming step, by inserting the guide shaft into a first coupling hole formed in the first plate and a second coupling hole formed in the second plate, coupling the first plate and the second plate to each other, and the arrangement step arranges the first plate and the second plate in the die in such a way that an axis of the first coupling hole of the first plate coincides with an axis of the second coupling hole of the second plate.

10. The sunroof device according to claim 1, wherein the first plate comprises a first engaging wall and the second plate comprises a second engaging wall, the first engaging wall defining the first engaging portion and the second engaging wall defining the second engaging portion, and each of the first engaging wall and the second engaging wall is curved in a respective arc shape when viewed in the vehicle width direction.

11. The sunroof device according to claim 10, wherein the first engaging wall is curved such that at an intermediate portion of the first engaging wall in the vehicle front-rear direction is positioned lower than a front edge portion of the first engaging wall and a rear edge portion of the first engaging wall, and the second engaging wall is curved such that at an intermediate portion of the second engaging wall in the vehicle front-rear direction is positioned lower than a front edge portion of the second engaging wall and a rear edge portion of the second engaging wall.

12. The sunroof device according to claim 2, wherein the first plate comprises a first engaging wall and the second plate comprises a second engaging wall, said part of the first plate extends from the first sidewall, said part of the second plate extends from the second sidewall, in the vehicle width direction, the first engaging wall extends with respect to the first sidewall in the same direction as a direction in which said part of the first plate extends from the first sidewall, and in the vehicle width direction, the second engaging wall extends with respect to the second sidewall in the same direction as a direction in which said part of the second plate extends from the second sidewall.

13. The sunroof device according to claim 3, wherein
the first plate comprises a first engaging wall and the second plate comprises a second engaging wall,
said part of the first plate extends from a first sidewall,
said part of the second plate extends from a second sidewall,
in the vehicle width direction, the first engaging wall extends with respect to the first sidewall in the same direction as a direction in which said part of the first plate extends from the first sidewall, and
in the vehicle width direction, the second engaging wall extends with respect to the second sidewall in the same direction as a direction in which said part of the second plate extends from the second sidewall.

14. The sunroof device according to claim 1, wherein
the first plate comprises a first engaging wall and the second plate comprises a second engaging wall, the first engaging wall defining the first engaging portion and the second engaging wall defining the second engaging portion, and
in the vehicle width direction, the first engaging wall and the second engaging wall face each other.

15. The sunroof device according to claim 1, wherein
when viewed from a respective side in the vehicle width direction, each of the first coupling hole and the second coupling hole has a circular shape, and each of the first engagement hole and the second engagement hole has an elliptical shape.

16. The method for manufacturing the driving shoe of the sunroof device according to claim 4, wherein the arranging step comprising disposing a core between the first sidewall and the second sidewall and inserting each of a plurality of shafts of the core into the first coupling hole, the first engagement hole, the second coupling hole, and the second engagement hole, respectively.

* * * * *